US006801818B2

(12) United States Patent
Kopcha

(10) Patent No.: US 6,801,818 B2
(45) Date of Patent: Oct. 5, 2004

(54) DISTRIBUTED PRODUCT DEVELOPMENT

(75) Inventor: Suzanne Miranda Kopcha, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 538 days.

(21) Appl. No.: 09/805,951

(22) Filed: Mar. 14, 2001

(65) Prior Publication Data

US 2002/0133250 A1 Sep. 19, 2002

(51) Int. Cl.[7] .......................... G06F 19/00; G06F 17/50
(52) U.S. Cl. ............................. 700/97; 703/1; 705/7
(58) Field of Search ........................... 700/96, 97, 182, 700/95; 707/102, 203; 702/84; 703/1; 705/7, 8

(56) References Cited

U.S. PATENT DOCUMENTS

| | | | |
|---|---|---|---|
| 4,646,238 A | 2/1987 | Carlson, Jr. et al. ........... 700/95 |
| 5,208,765 A | * 5/1993 | Turnbull ...................... 702/84 |
| 5,231,567 A | 7/1993 | Matoba et al. .............. 700/100 |
| 5,311,424 A | 5/1994 | Mukherjee et al. ........... 705/29 |
| 5,311,438 A | * 5/1994 | Sellers et al. .................. 700/96 |
| 5,446,903 A | 8/1995 | Abraham et al. ........... 710/240 |
| 5,634,101 A | 5/1997 | Blau ............................ 705/10 |
| 5,646,862 A | 7/1997 | Jolliffe et al. .................. 703/1 |
| 5,664,109 A | 9/1997 | Johnson et al. ................ 705/2 |
| 5,737,727 A | 4/1998 | Lehmann et al. .............. 705/7 |
| 5,745,390 A | 4/1998 | Daneshgari ................. 702/119 |
| 5,767,848 A | 6/1998 | Matsuzaki et al. .......... 345/751 |
| 5,864,480 A | 1/1999 | Ladd ........................... 700/83 |
| 5,907,494 A | * 5/1999 | Dangelo et al. ................ 703/1 |
| 5,999,908 A | 12/1999 | Abelow ......................... 705/1 |
| 6,006,022 A | 12/1999 | Rhim et al. .................... 716/1 |
| 6,006,195 A | 12/1999 | Marchak et al. ............... 705/9 |
| 6,032,123 A | 2/2000 | Jameson ........................ 705/8 |
| 6,036,345 A | 3/2000 | Jannette et al. ............... 700/97 |
| 6,038,517 A | 3/2000 | Dobbins et al. .............. 702/82 |
| 6,038,563 A | * 3/2000 | Bapat et al. .................. 707/10 |
| 6,044,354 A | 3/2000 | Asplen, Jr. ..................... 705/7 |
| 6,047,290 A | 4/2000 | Kennedy et al. ........ 707/103 R |
| 6,052,693 A | 4/2000 | Smith et al. ............. 707/104.1 |
| 6,070,143 A | 5/2000 | Barney et al. ................. 705/8 |

(List continued on next page.)

FOREIGN PATENT DOCUMENTS

| | | |
|---|---|---|
| DE | 1974574 | 5/1999 |
| DE | 19751273 | 5/1999 |
| DE | 199 14 819 A1 | 10/2000 |
| EP | 0 488 246 B1 | 6/1992 |
| EP | 0 639 815 A2 | 2/1995 |
| EP | 10171871 | 6/1998 |
| EP | 0 895 171 A2 | 2/1999 |
| JP | 7016837 | 1/1995 |
| WO | WO 00/16228 | 3/2000 |
| WO | WO 00/19345 | 4/2000 |

OTHER PUBLICATIONS

Spellman, Peter J., et al., "Collaborative Virtual Workspace", SIGGROUP: ACM Special Interest Group on Supporting Group Work, 1997, pp. 197–203.

*Primary Examiner*—Leo Picard
*Assistant Examiner*—Sheela S. Rao
(74) *Attorney, Agent, or Firm*—Leonard W. Lewis

(57) ABSTRACT

Product development is accomplished through a plurality of product development tools, each tool assisting in a separate aspect of product development. Each tool has at least one instantiation of a tool module implementing tool logic and a tool database accessible by each tool module. Each product development tool communicates with a global readiness database. The readiness database includes common information accessible by more than one of the product development tools. At least one product supply tool accesses the readiness database to read product development information.

28 Claims, 3 Drawing Sheets

U.S. PATENT DOCUMENTS

| | | | |
|---|---|---|---|
| 6,138,104 A | 10/2000 | Marchak et al. | 705/9 |
| 6,141,647 A | 10/2000 | Meijer et al. | 715/505 |
| 6,161,113 A | 12/2000 | Mora et al. | 707/10 |
| 6,233,493 B1 * | 5/2001 | Cherneff et al. | 700/95 |
| 6,295,536 B1 | 9/2001 | Sanne | 707/200 |
| 6,321,204 B1 * | 11/2001 | Kazami et al. | 705/7 |
| 6,327,594 B1 | 12/2001 | Van Huben et al. | 707/200 |
| 6,341,287 B1 | 1/2002 | Sziklai et al. | 707/102 |
| 6,351,734 B1 * | 2/2002 | Lautzenheiser et al. | 705/8 |
| 6,353,824 B1 | 3/2002 | Boguraev et al. | 707/5 |
| 6,389,436 B1 | 5/2002 | Chakrabarti et al. | 715/513 |
| 6,438,594 B1 | 8/2002 | Bowman-Amuah | 709/225 |
| 6,445,974 B1 * | 9/2002 | Malaugh et al. | 700/182 |
| 6,505,191 B1 | 1/2003 | Baclawski | 707/3 |
| 2001/0032105 A1 | 10/2001 | Frye et al. | 705/7 |
| 2002/0010041 A1 | 1/2002 | Harshaw | 705/10 |
| 2002/0029150 A1 | 3/2002 | Vitale et al. | 705/1 |
| 2002/0072956 A1 | 6/2002 | Willems et al. | 705/10 |

* cited by examiner

DISTRIBUTED PRODUCT DEVELOPMENT

BACKGROUND OF THE INVENTION

1. Field of the Invention

The present invention relates to computer-based tools for global product readiness assessment.

2. Background Art

Product development is often a complex and multifaceted process. The process typically begins when a concept or idea for a new product or an improvement to an existing product is developed and approved. Initial specifications and descriptions describing the product may next be developed. Experimental designs or formulas combining experimental materials and component parts are tested, analyzed and refined until an initial product emerges. Typically, the product is then ready for initial consumer testing. The test product is constructed from a stable formula or design using specified materials or component parts. Batch records are maintained of the test process. For many consumer products, test packaging must also be prepared. For multinational products, test countries must be selected while considering national and regional standards and regulations.

As product development proceeds, formulas and designs are refined. Brands, variants and options are determined to meet customer expectations, regional preferences and regulations, and marketing strategies. Regulation and safety impact is determined. Various artwork, including graphical and textual support, is developed. Such artwork includes package labeling, safety labeling, package inserts, product labeling, instruction manuals, warranty inserts, assembly instructions, advertising and the like.

Throughout the development process, and particularly approaching product launch, technical standards must be developed and maintained. Regulatory and safety approvals for various brands, variance and options in each target country must be obtained. Product specifications, detailed design descriptions, and formulas must be finalized and formatted for mass production. Raw material standards, component element standards, packing material standards, packaging standards, and the like must be developed and approved. Documentation and specifications for raw material and component element suppliers must be developed. Processing standards and methods are also required, as well as various acceptance and validation criteria. As launch-readiness nears, lead markets are determined and prepared. Plans are finalized for product expansion through various approval gates, both internal and external.

Typically, each aspect of product design requires specialized tools or applications to assist in creating, reviewing, approving, and tracking product development data and propositions. Often, data developed by one type of application must be shared in some manner with at least one other type of application. For example, a product formula may undergo many revisions during the concept phase. These variations, together with information describing each variation, must be logged. Once one or more candidate formulas are determined, safety clearances may be performed. Consumer testing requires that the formula be released at some level and distributed for batch production. Consumer test results must be reviewed, tracked and analyzed. The cycle of experimentation, safety verification and consumer testing may be repeated until an acceptable result is obtained. The formula must then be examined for manufacturability. Regulatory clearances must be obtained and documented for each target market. Lead markets must be determined and prepared for the product. Prior to launch, the formula must be reviewed and approved. Thus, as a formula undergoes changes throughout product development, these changes and their impacts must be documented and analyzed. Further, additional data will be associated with the formula throughout the product development lifecycle. This data includes test plans, test results, raw material lists, supplier designations, costing estimates, process descriptions, restriction and precaution information, and the like. Thus, many different applications may be associated with a particular type of product development data, such as a product formula.

Various techniques and systems have been proposed for managing and utilizing product development data in a global environment. One solution is to design a single very large information and associated work process application for all product development. However, such an application tends to be inflexible and to provide the lowest common denominator of application services rather than flexible customized services for each product development application. A second solution is to design multiple independent applications, each optimized for a particular product development function. If these applications are not linked, common data must be re-entered in each application, creating redundancies of information with all of the associated difficulties such as update control, access restriction, ownership problems, validation problems, and the like. Multiple independent applications may be linked to share data. However, such linking limits flexibility to change any application, as changes to one application must be reflected in changes to the links to all other applications.

What is needed is distributed product development that supports creation, review, approval and storage of key data and clearances by various product development functions. All stages of product development must be supported, from conception through initiative expansion. Individual applications must be flexible and responsive to the needs of targeted users. Further, changes to one application should not have drastic impact on other applications.

SUMMARY OF THE INVENTION

A system for product development is provided. The system includes a plurality of product development tools. Each product development tool assists in a separate aspect of product development. Each tool has at least one instantiation of a tool module implementing tool logic and a tool database accessible by each tool module. Each product development tool communicates with a readiness database. The readiness database includes common information accessible by the product development tools. At least one product supply tool accesses the readiness database to read product development information needed for purchasing, manufacturing, distribution, and the like.

Many product development tools are possible. A technical standards application stores approved technical standards in the readiness database. An experimental materials application stores early development information in the readiness database. A consumer test application stores approved information about test placement products and consumer test design in the readiness database. A regulatory clearance tracking application stores information describing clearance of products in the readiness database. An artwork application stores approved artwork in the readiness database. A plant test approval application stores plant testing information in the readiness database. A launch-readiness application stores pre-production launch information in the readiness database. A safety tool stores material and product safety testing results in the readiness database. A laboratory management information system tool stores information describing analysis of product related items in the readiness database. A formulation tool stores product formulation and design information in the readiness database. A package design tool stores packaging information in the readiness database. A business-to-business portal permits outside access to the readiness database.

In an embodiment of the present invention, the readiness database grants read-only access to particular information to at least one product development tool. The readiness database may also deny access to particular information to at least one product development tool.

In another embodiment of the present invention, the readiness database maintains a change history for particular information. Change history may also be maintained within the product development tools.

A method of product development is also provided. Product development information is developed in one of a plurality of product development tools. The information is stored in a tool database accessible only through the development tool in which the information was developed. Information accessible by more than one product development tool is stored in a readiness database. Access is permitted to the readiness database information by the product development tools. Information in the readiness database is read with at least one product supply tool.

Developing a product also includes determining product development data types. Each data type contains data developed with one of a plurality of product development tools. For each product development data type, a determination is made as to whether or not data of the data type is to be accessible by at least one product development tool in addition to the product development tool in which data for the data type is developed. If the data type is not accessible by at least one additional product development tool, the data is stored in a database accessible only by the product development tool in which data for the data type is developed. If the data type is accessible by at least one additional product development tool, the data is stored in a readiness database accessible by each product development tool.

In an embodiment of the present invention, business rules for changing data of the data type are determined if at least one additional product development tool needs to change data of the data type. These business rules may be a function of the product design lifecycle stage.

In another embodiment of the present invention, security rules are determined based on each product development tool with viewing security restrictions if data of the data type has any viewing security restrictions.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
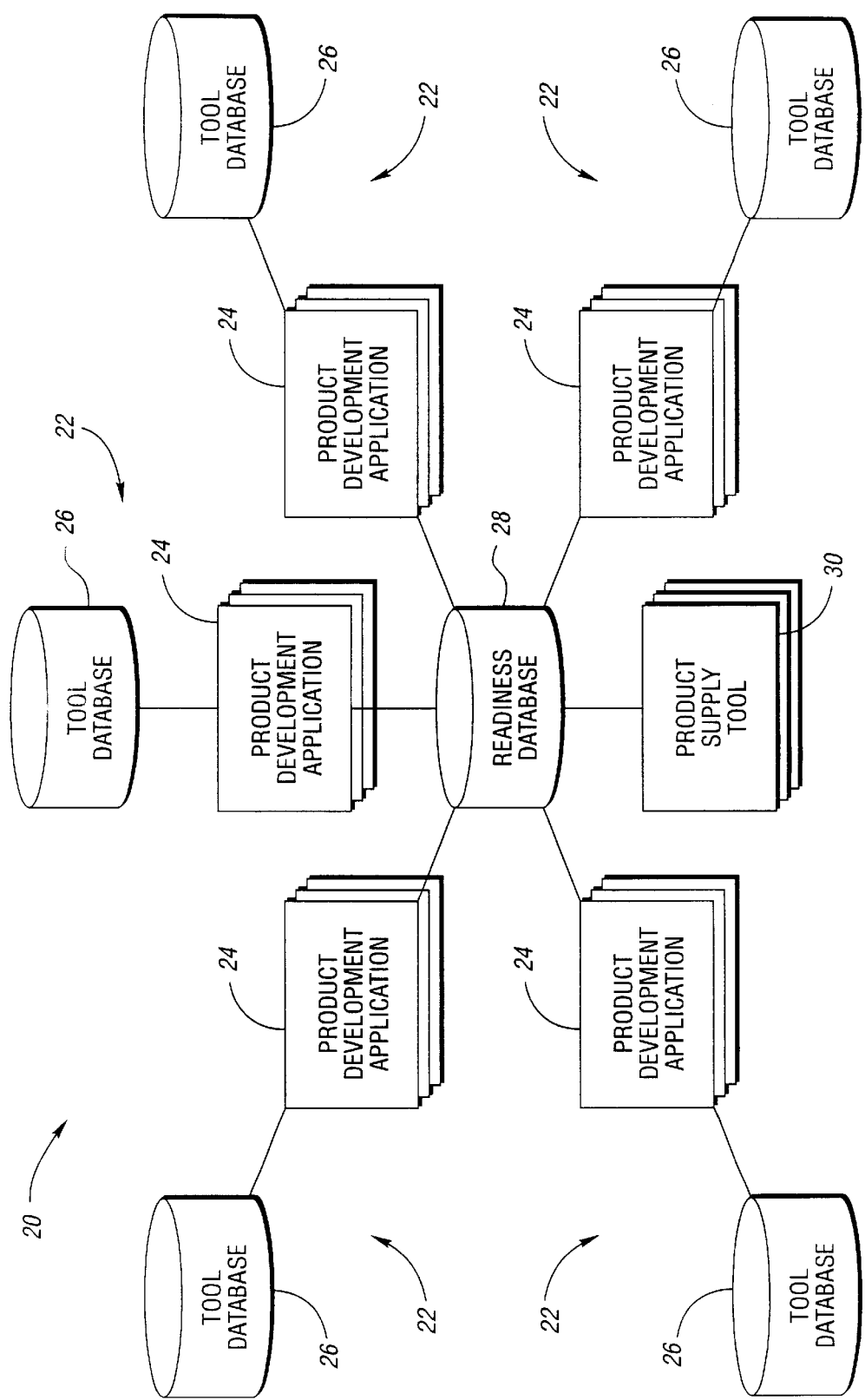
FIG. 1 is a block diagram illustrating a generalized distributed product development system according to an embodiment of the present invention.

Referring to FIG. 1, a block diagram illustrating a generalized distributed product development system according to an embodiment of the present invention is shown. A distributed product development system, shown generally by 20, includes a plurality of product development tools, each of which is shown generally by 22. Each product development tool includes at least one instantiation of a tool module or product development application 24 implementing logic for a particular aspect of product development. Product development tool 22 also includes tool database 26 accessible only by each tool module 24. Product development system 20 also includes readiness database 28 accessible by each instantiation of tool module 24. Readiness database 28 contains common information accessible by product development tools 22. Product development system 20 also includes at least one product supply tool 30 capable of reading product development information from readiness database 28.

Throughout the product development lifecycle, product development information is developed in each product development tool 22. The information is stored in tool database 26, accessible only through product development tool 22 in which the information was developed. If the type of information is determined to be accessible in some manner by other product development tools 22, the information is stored in readiness database 28. Access to information in readiness database 28 is permitted to product development tools 22 based on a variety of factors including information type, product development tool 22 type, authorization of a particular user within product development tool 22, authorization of a particular user by readiness database 28, product development lifecycle stage, and the like. At the appropriate point in the product development lifecycle, product information held in readiness database 28 may be read by product supply tool 30. Product supply tool 30 provides an interface between product development and the product supply chain, which typically includes manufacturing, purchasing, engineering, material and subcomponent suppliers, contract manufacturers, joint venture partners, and the like.

Readiness database 28 supports many functions which would be difficult or impossible to provide by individual product development tools 22. For example, readiness database 28 provides security requirements for key data in an integrated enterprise system such that external sharing of key data, and even unwanted internal sharing across business units, is prevented. This is accomplished when readiness database 28 denies access to particular information to one or more product development tools 22. Even amongst those product development tools 22 and product supply tools 30 which are permitted to view particular product development information, unwanted modification of such information is a potential problem. Readiness database 28 resolves this problem by granting read-only access of particular information to those product development tools 22 and product supply tools 30 having access authority but not change authority. A further critical function is tracking and logging changes that are made to product development information. Readiness database 28 maintains a change history for particular information to permit authorized users the ability to determine what changes were made, when these changes were made, by whom these changes were made, through which product development tool 22 these changes were made, and the like. Thus, the ability of readiness database 28 to restrict access and change of product development information, as well as to log changes to product development information, permits data to be captured and maintained in a manner which meets validation requirements for regulated products such as, for example, good laboratory practice, good manufacturing practice, and the like.

Figure 2:
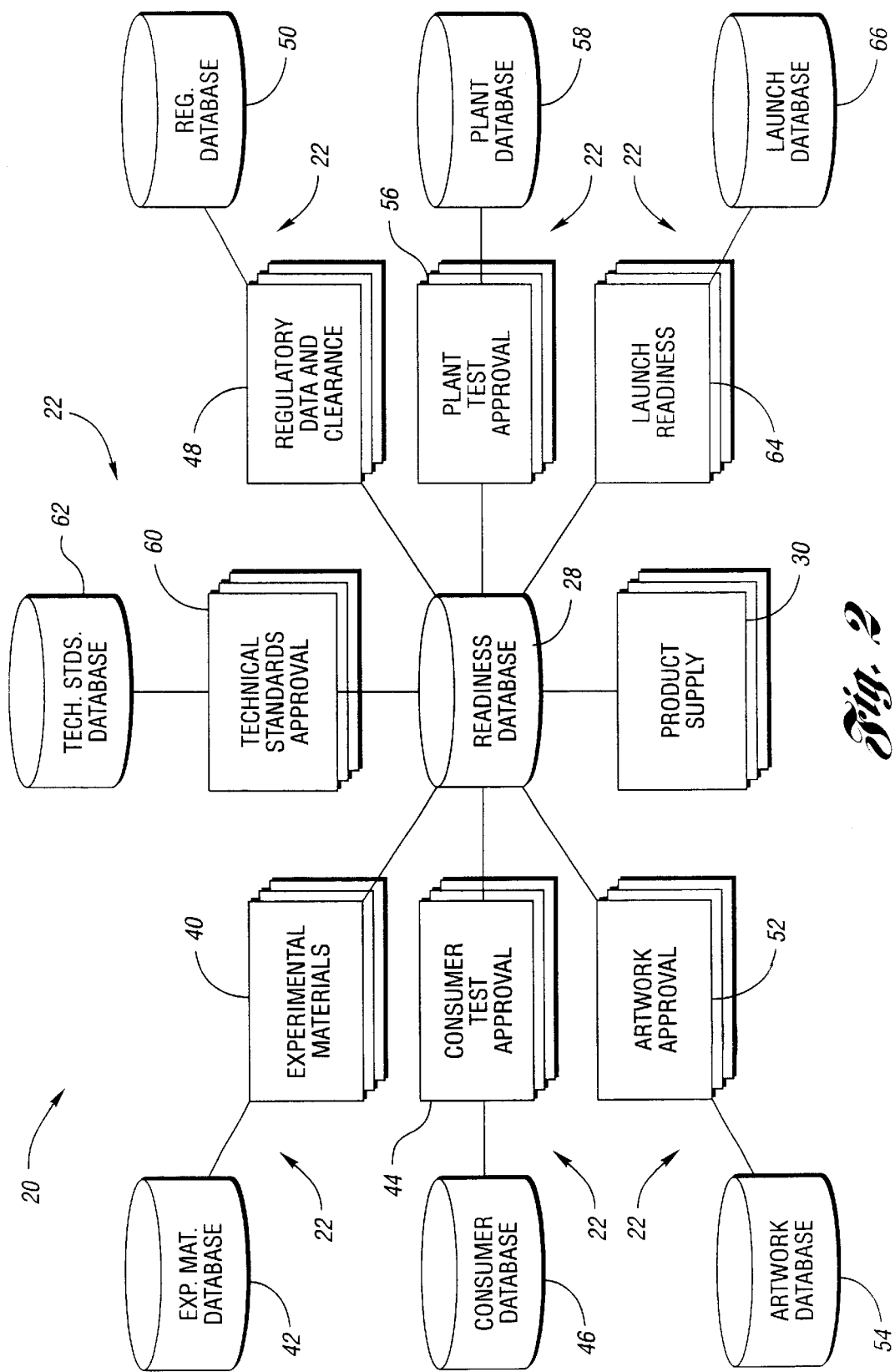
FIG. 2 is a block diagram illustrating a distributed product development system for developing global consumer products according to an embodiment of the present invention.

Referring now to FIG. 2, a block diagram illustrating a distributed product development system for developing global consumer products according to an embodiment of the present invention is shown. Readiness database 28 may be implemented in any manner supporting global accessibility to stored information. Readiness database 28 may be implemented as more than one physical database and may be distributed across more than one location. For example, readiness database 28 may comprise an ORACLE8 database supported by a data server.

Product supply tool 30 may be any tool or application capable of accessing readiness database 28. For example, product supply tool 30 may implement enterprise resource planning (ERP) through tools such as, for example, are available from SAP®, running on one or more Unix servers. Thus, authorization for various activities such as purchasing of materials, product manufacturing, shipment of product, and the like, can be seamlessly connected with product development operations without manually reentering information.

Product development system 20 includes experimental material application 40 accessing local experimental materials database 42 and readiness database 28. Experimental material application 40 is used to generate, manipulate and store information regarding materials, formulas and designs of products while in the experimental or conception stage. Experimental material application 40 may be implemented using EMATRIX software, from MatrixOne, Inc., running on a Unix server accessing experimental database 42 implemented as an ORACLE8 database. Preferably, experimental material application 40 permits Internet access to readiness database 28 and experimental database 42 through a standard web browser such as INTERNET EXPLORER or NETSCAPE 6.

Consumer test approval application 44 accesses local consumer database 46 and readiness database 28. Consumer test approval application 44 stores approved information about test placement products and consumer test design in readiness database 28. Consumer test approval application 44 assists in approving not only product and packages for test placement, but also consumer tests and test results. Consumer test approval application 44 may be implemented through LOTUS NOTES running on a WINDOWS NT server accessing consumer database 46 implemented as a Lotus NOTESDATABASE.

Regulatory data and clearance application 48 accesses local regulatory database 50 and readiness database 28. Regulatory data and clearance application 48 permits tracking for clearance of product related items such as products, packages, materials, and the like in each target country and region. Regulatory data and clearance application 48 may be implemented using tools such as POWERBUILDER from Sybase, Inc., MICROSOFT ACCESS, LOTUS NOTES, and the like. Regulatory database 50 may be implemented using a standard database such as Lotus NOTESDATABASE, ORACLE8, and the like.

Regulatory data and clearance application 48 may include tracking for testing and clearance of safety issues related to products, materials, packaging, artwork, and the like. Safety clearance support may also be provided by a separate tool.

Artwork approval application 52 accesses local artwork database 54 and readiness database 28. Artwork approval application 52 assists in approving artwork that is subsequently linked to a variety of product objects such as the product itself, product packaging, product target location, and the like. Artwork approval application 52 may be implemented using LOTUS NOTES running on a WINDOWS NT server accessing artwork database 54 implemented as a Lotus NOTESDATABASE. Artwork approval application 52 may permit access to data through a standard web browser.

Plant test approval application 56 accesses local plant database 58 and readiness database 28. Plant test approval application 56 assists in the approval of plant testing as part of product scale-up and subsequent launch. Plant test approval application 56 may be implemented using LOTUS NOTES running on a Unix server accessing plant database 58 implemented as an ORACLE8 database. Plant test approval application 56 may permit access to data through a standard web browser.

Technical standards approval application 60 accesses local technical standards database 62 and readiness database 28. Technical standards approval application 60 permits creation, review and approval of product, package, material, process, and test method requirements. These requirements may apply to production or plant test situations. These requirements may also apply to earlier developmental stages, such as consumer testing, in which case other product development tools 22 must access technical standards information. For example, since approved artwork must appear on the proper package material, approved artwork must be linked to technical standards. Technical standards approval application 60 may be implemented using EMATRIX software running on a Unix server with technical standards database 62 implemented as an ORACLE8 database. Technical standards approval application 60 may permit access to data through a standard web browser.

Launch readiness application 64 accesses local launch database 66 and readiness database 28. Launch readiness application 64 assists in the approval of information related to test markets, lead market launches and subsequent expansion. Thus, launch readiness information may be linked to technical standards data and regulatory clearances. Launch readiness application 64 may be implemented using LOTUS NOTES running on a Unix server accessing launch database 66 implemented as an ORACLE8 database. Launch readiness application 64 may permit access to data through a standard web browser.

As will be recognized by one of ordinary skill in the art, many other types of product development tools 22 are possible. For example, a laboratory information management system might develop information relating to laboratory analysis of products, environments, materials, and the like. A formulation tool processes information related to business-specific calculations of product formulation or design. A package design tool assists in package design issues such as, for example, designs of consumer units, customer units, transport units, and the like, based on product specifications provided by one or more other tools. A business-to-business portal tool permits access to global product development data by outside partners such as suppliers, financiers, distributors, consultants, contractors, and the like.

Figure 3:
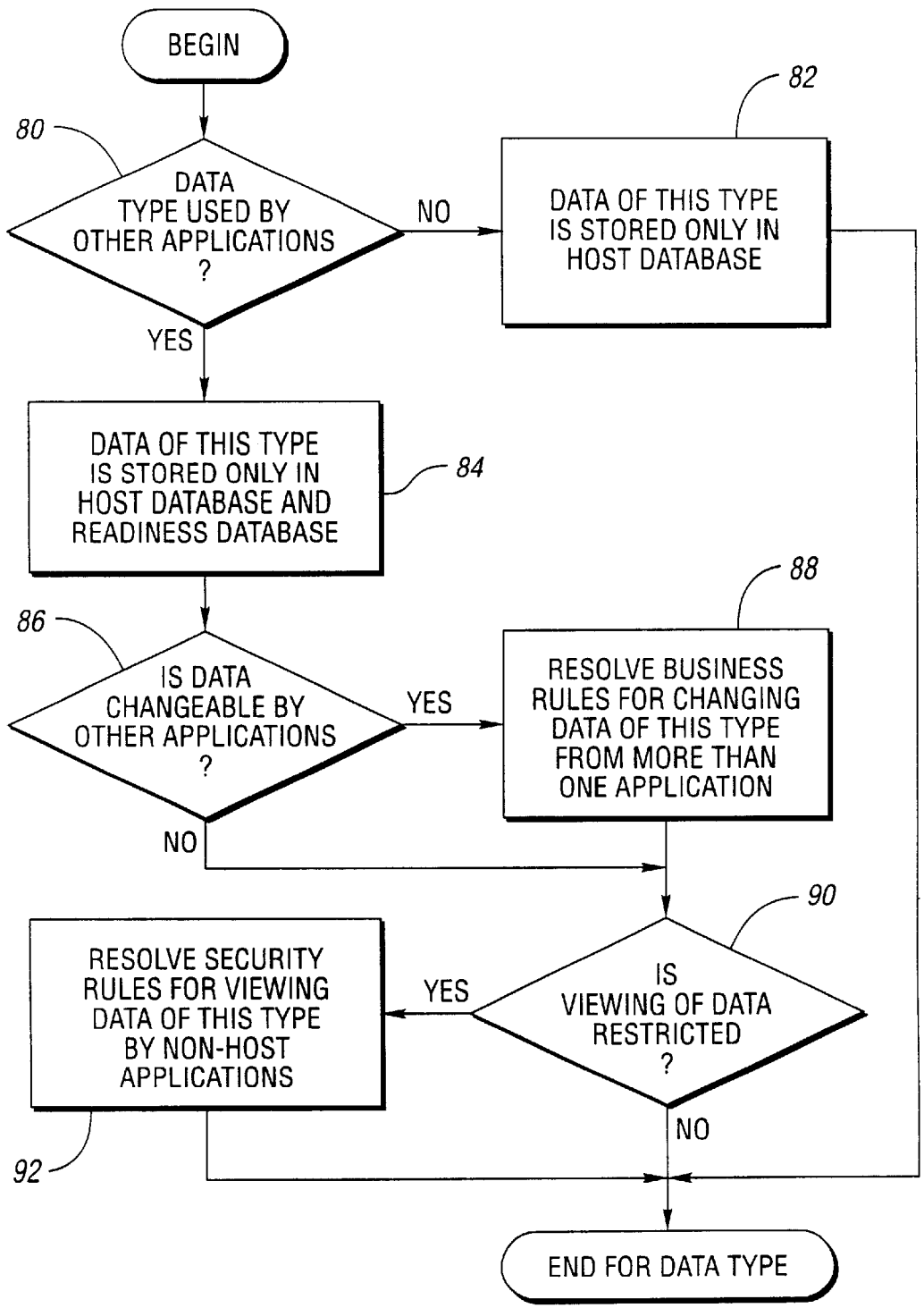
FIG. 3 is a flow diagram illustrating a method of developing distributed product development data types according to an embodiment of the present invention.

Referring now to FIG. 3, a flow diagram illustrating a method of developing distributed product development data types according to an embodiment of the present invention is shown. As will be appreciated by one of ordinary skill in the art, the operations illustrated in the flow diagram are not necessarily sequential operations. The order of steps may be modified within the spirit and scope of the present invention. Also, the method illustrated may be implemented by any combination of hardware, software, firmware, and the like. The present invention transcends any particular implementation and the embodiment is shown in sequential flow chart form for ease of illustration.

Each type of data used for product development is first examined to determine if data of this type is used by other applications in block 80. A type of data such as, for example, packaging artwork, is considered when that data type is created for use in a host product development application 24 generating data of this data type. If data of this data type is to be used only by host application 24, then data of this type need only be stored in tool database 26 associated with host application 24. If, on the other hand, data of this type is used in some manner by at least one product development tool 22 in addition to host product development tool 22 in which data for the data type is developed, data of this type is stored in both host tool database 26 and readiness database 28. This decision may be modified at any time if product developers determine that the usage of data of the particular data type has changed.

Change history responsibility must also be determined. If data of the particular type being considered is only changed by host application 24, then change history need only be maintained by host application 24. The change history may be stored in either tool database 26 servicing host application 24 or in readiness database 28. If data of the particular database can be changed by more than one product development tool 26, several options are possible. A first option is to place change history under the control of readiness database 28. A second option, available when different tools 22 change data at different phases of product development, is to pass control to product development tool 22 which has current authorization to change. A third option is to keep all change records in readiness database 28 but vest all modification control of the change records in one product development tool 22, such as host application 24. Thus any change to the data, together with associated information such as tool 22 from which the data was changed, time of change, user changing data, and the like, would be automatically added by readiness database 28. However, only an authorized user operating through host application 24 could perform modification operations to change records such as edit, transfer, delete, or the like.

If data of the particular data type is to be stored in readiness database 28, a check is made to determine if the data is changeable by product development applications 24 other than host product development application 24 in block 86. If data of the particular data type is changeable by at least one additional product development application 24, then business rules for changing data of this type must be resolved in block 88. For example, one product development tool 22 may alter data at one phase in the product development lifecycle, while another product development tool 22 may alter the data at a different phase in the product development lifecycle. Hence, readiness database 28 may lock out all but one product development tool 22 during each product development lifecycle phase. Changes in product development lifecycle phases are typically indicated through authorized approvals of particular data or product development events.

A check is made to determine if viewing of data of the particular type is restricted in block 90. If some restriction is required, security rules for viewing data of this type are resolved in block 92. These rules may be based, as well, on product development lifecycle phase. They may also be based on approval status, individual user authorization, product development roles, and the like.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for product development comprising:
   a plurality of product development tools, each product development tool assisting in a separate aspect of product development, each product development tool comprising at least one instantiation of a tool module implementing tool logic and a tool database accessible by each tool module;
   a readiness database in communication with each product development tool, the readiness database comprising common information accessible by the product development tools; and
   at least one product supply tool in communication with the readiness database, each product supply tool operative to read product development information from the readiness database.

2. A system for product development as in claim 1 wherein one of the product development tools is a technical standards application storing approved technical standards in the readiness database.

3. A system for product development as in claim 1 wherein one of the product development tools is an experimental materials application storing early development information in the readiness database.

4. A system for product development as in claim 1 wherein one of the product development tools is a consumer test application storing approved information about test placement products and consumer test design in the readiness database.

5. A system for product development as in claim 1 wherein one of the product development tools is a regulatory clearance tracking application storing information describing clearance of product related items in the readiness database.

6. A system for product development as in claim 1 wherein one of the product development tools is an artwork application storing approved artwork in the readiness database.

7. A system for product development as in claim 1 wherein one of the product development tools is a plant test approval application storing plant testing information in the readiness database.

8. A system for product development as in claim 1 wherein one of the product development tools is a launch readiness application storing pre-production production launch information in the readiness database.

9. A system for product development as in claim 1 wherein one of the product development tools is a laboratory management information system application storing information describing analysis of product related items in the readiness database.

10. A system for product development as in claim 1 wherein one of the product development tools is a formulation application storing product formulation and design information in the readiness database.

11. A system for product development as in claim 1 wherein one of the product development tools is a package design application storing packaging information in the readiness database.

12. A system for product development as in claim 1 wherein one of the product development tools is a business-to-business portal permitting access to the readiness database.

13. A system for product development as in claim 1 wherein one of the product development tools is a business-to-business portal application permitting access to product development information stored in the readiness database.

14. A system for product development as in claim 1 wherein the readiness database grants read only access to particular information to at least one product development tool.

15. A system for product development as in claim 1 wherein the readiness database denies access to particular information to at least one product development tool.

16. A system for product development as in claim 1 wherein the readiness database maintains a change history for particular information.

17. A method of product development comprising:
developing product development information in one of a plurality of product development tools;
storing the information in a tool database accessible only through the development tool in which the information was developed;
storing information accessible by more than one product development tool in a readiness database;
permitting access to readiness database information by the plurality of product development tools; and
reading the readiness database information with at least one product supply tool.

18. A method of product development as in claim 17 wherein information written to the readiness database by a first product development tool may be only read by a second product development tool.

19. A method of product development as in claim 17 wherein access to information written to the readiness database by a first product development tool is denied to a second product development tool.

20. A method of product development as in claim 17 further comprising storing a change history for the information in the readiness database.

21. A method of product development comprising:
determining a plurality of product development data types, each data type operative to contain data developed with one of a plurality of product development tools;
for each product development data type, determining if each data type is to be accessible by at least one product development tool in addition to the product development tool in which data for the data type is developed;
if the data type is not accessible by at least one additional product development tool, storing the data in a database accessible only by the product development tool in which data for the data type is developed; and
if the data type is accessible by at least one additional product development tool, storing the data in a readiness database in communication with each product development tool.

22. A method of product development as in claim 21 further comprising:
determining if at least one additional product development tool needs to change data of the data type; and
determining business rules for changing data of the data type.

23. A method of product development as in claim 21 wherein the business rules are functions of the data lifecycle stage.

24. A method of product development as in claim 21 further comprising:
determining if data of the data type has any viewing security restrictions; and
determining security rules based on each product development tool with viewing security restrictions.

25. A system for product development comprising:
a globally accessible readiness database comprising common information accessible by product development tools;
a technical standards application accessing a local technical standards database and the readiness database, the technical standards application storing approved technical standards in the readiness database;
an experimental materials application accessing a local experimental materials database and the readiness database, the experimental material application storing early development information in the readiness database;
a consumer test application accessing a local consumer test database and the readiness database, the consumer test application storing approved information about test placement products and consumer test design in the readiness database;
a regulatory clearance tracking application accessing a local regulatory database and the readiness database, the regulatory clearance tracking application storing information describing clearance of products in the readiness database;
an artwork application accessing a local artwork database and the readiness database, the artwork application storing approved artwork in the readiness database;
a plant test approval application accessing a local plant database and the readiness database, the plant test approval application storing plant testing information in the readiness database;
a launch readiness application accessing a local launch database and the readiness database, the launch readiness application storing pre-production launch information in the readiness database; and
at least one product supply application in communication with the readiness database, each product supply application operative to read product development information from the readiness database.

26. A system for product development as in claim 25 wherein the readiness database grants read only access to particular information to at least one application.

27. A system for product development as in claim 25 wherein the readiness database denies access to particular information to at least one application.

28. A system for product development as in claim 25 wherein the readiness database maintains a change history for particular information.

* * * * *

UNITED STATES PATENT AND TRADEMARK OFFICE
CERTIFICATE OF CORRECTION

PATENT NO. : 6,801,818 B2  
DATED : October 5, 2004  
INVENTOR(S) : Suzanne Miranda Kopcha Page 1 of 1

It is certified that error appears in the above-identified patent and that said Letters Patent is hereby corrected as shown below:

Title page,
Item [56], References Cited, FOREIGN PATENT DOCUMENTS, delete the sixth reference shown as "EP 10171871 6/1998" and insert therefor -- JP 10171871 6/1998 --.

Column 8,
Line 59, delete "production" after "pre-production."

Signed and Sealed this

Eighteenth Day of January, 2005

JON W. DUDAS  
*Director of the United States Patent and Trademark Office*